Nov. 20, 1934.                J. R. BOYD                1,981,776
                            RIM CONSTRUCTION
                          Filed May 25, 1933
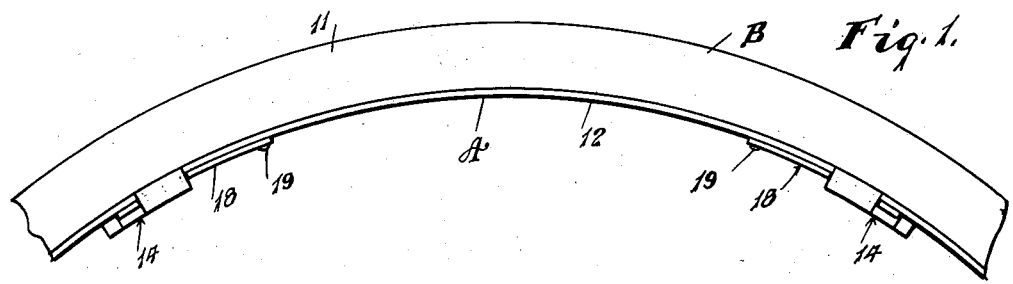
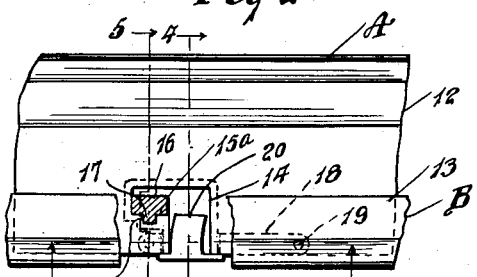
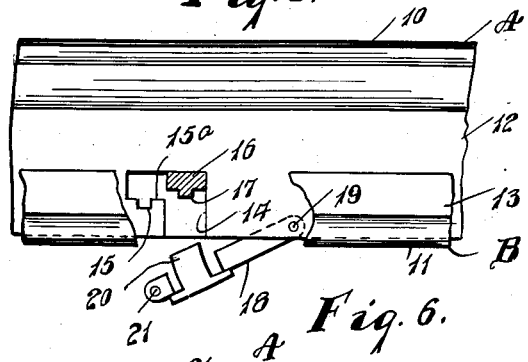
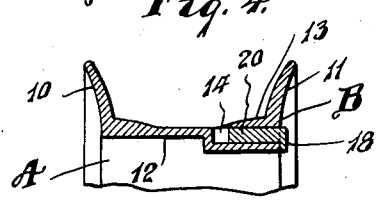
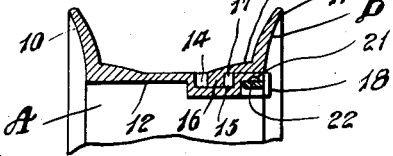
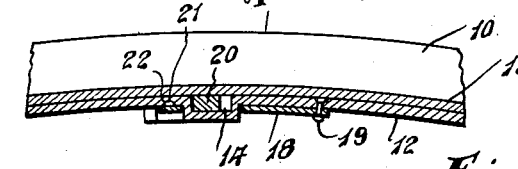
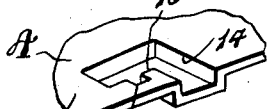
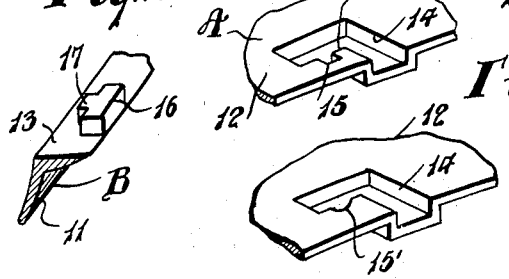
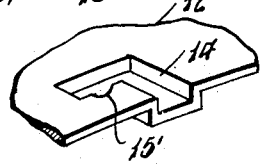
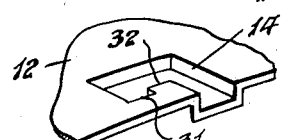
Inventor
J. R. Boyd.
By L. F. Randulph Jr.
Attorney Patented Nov. 20, 1934

1,981,776

UNITED STATES PATENT OFFICE 1,981,776

RIM CONSTRUCTION

John Robinson Boyd, Natchez, Miss.

Application May 25, 1933, Serial No. 672,874

1 Claim. (Cl. 152—21)

This invention relates to a wheel rim construction.

It is primarily aimed to provide a novel means whereby time and trouble may be saved in changing vehicle tires especially since it dispenses with the use of bolts, screws or other fastenings or any means requiring tools for manipulation.

It is also a prime object of the present invention to provide a construction wherein the parts of the rim are held in applied position through the inflation of the tire.

The more specific objects and advantages will become apparent from a consideration of the description following taken in connection with accompanying drawing illustrating an operative embodiment.

In said drawing:—

Figure 1 is a view in elevation showing a portion of a demountable wheel rim embodying the invention, Figure 2 is an enlarged plan view of the rim adjacent one of the zones of connection, partly broken away and in section, Figure 3 is a plan view of the parts of Figure 2 showing the latch in open position, Figure 4 is a cross sectional view taken on the line 4—4 of Figure 2, Figure 5 is a cross sectional view taken on the line 5—5 of Figure 2, Figure 6 is a longitudinal sectional view taken on the line 6—6 of Figure 2, and Figure 7 is a fragmentary inverted view in perspective of a section of the removable flange, Figure 8 is a fragmentary view in perspective of the rim, and Figures 9 and 10 are views similar to Figure 8 showing slightly modified constructions.

Referring specifically to the drawing, wherein like reference characters designate like or similar parts, and first to the form of Figures 1 to 6, a demountable rim for vehicle wheels is shown comprising separable sections A and B. These sections are shaped collectively according to the shape of the particular tire to be mounted or accommodated. Each of the sections A and B has a side flange 10 and 11, respectively, to form a channel within which the tire is received. Section 10 has an annular main wall at 12, within which telescopes separably, an annular wall 13 of the section 11. At equidistant points about the free edge of the main wall 12, are angular grooves 14, the shape of which is best shown in Figure 3. Such grooves or slots may be two in number or of any other desired number, equidistantly spaced about the rim. Said grooves or slots 14 are generally of L or bayonet shape, opening at the free edge of the wall 12 and each having a recess as at 15, communicating therewith, and providing a shoulder 15ª intermediate the ends of the slot.

The wall 13 has radial lugs 16 thereon equal in number to the slots 14, with a projection 17 to engage in said recesses.

A tire, or casing and tube, is adapted to be applied to the wall 12 and the section B then applied laterally with the wall 13 telescoping within the wall 12 and with the lugs 16 entering the slots 14. Such lugs after being entered in the grooves or slots, through the turning of the section B, are moved into the angular portion or the closed ends of the grooves or slots with the recesses 15 and projections 17 oppositely disposed. The tire is thereupon inflated and its expansion against the flanges 10 and 11 forces the sections apart to the extent of engagement of projections 17 in recesses 15, such lugs being held against circumferential movement by engagement of said projections in the recesses. Thus the tire when inflated aids in maintaining the rim sections connected and permits ready assembly and disassembly of the rim. It will also be realized that the portions of the rim engaged by the tire are flush as far as practical so as to avoid abrasion of the casing and tube. The construction also prevents injury to the casing and tube as may happen in ordinary construction, through stretching and forcing of the same onto the rim.

At one or all of the joints afforded by the slots 14 and lugs 16, a securing latch 18 may be provided. Such latches are in the form of levers or bars pivoted as at 19 to the wall 12 and located on the innermost annular wall of the rim. Each lever or bar 18 has a projection 20 thereon adapted to occupy the open or entrance end of the slots. Such arms or levers 18 are resilient to a degree and have teats 21 thereon adapted to snap into retaining recesses or depressions 23 formed in the wall 12, the spring action of the levers 18 urging them outward at their free ends so as to normally effect engagement of the teats 21 and recesses 22.

A modified form is shown in Figure 9. It differs from the other form in that the recess here shown at 15', which functions exactly like that at 15, is curved, to engage a similarly shaped projection (not shown) on a lug 16.

In Figure 10 is shown a further modification in which the groove or slot 14 is provided with an enlarged offset portion 31 providing a tongue or shoulder 32 to receive a lug free of a projection.

Various changes may be resorted to provided they fall within the spirit and scope of the invention as claimed.

What I claim as my invention is:—

A rim construction of the class described, comprising separable parts collectively forming a channel to receive a tire, one of said parts having a main wall provided with slots substantially of L-shape opening at the free edge of said wall, said slots having inner and outer walls substantially parallel to the sides of the rim, said outer walls having shoulders disposed transversely of said main wall, the other part having an annular wall to telescope with said main wall, lugs on said annular wall adapted to be passed into said slots and then moved past said shoulders through circumferential movement of the parts, the inflation of the tire serving to spread the parts so that said lugs will be engaged by the shoulders to prevent detachment of the parts through circumferential movement, said slots having side walls extending inwardly from the free edge of the main wall, closures pivotally secured to the main wall and having spaced openings therein, said openings being adapted to receive the side walls of the slots and the closures to close the entrances to the slots on a line substantially coinciding with their outer walls.

JOHN ROBINSON BOYD.